(12) United States Patent
Grandemange et al.

(10) Patent No.: US 11,325,424 B2
(45) Date of Patent: May 10, 2022

(54) TIRE WITH OPTIMISED TREAD

(71) Applicant: COMPAGNIE GENERALE DES ETABLISSEMENTS MICHELIN, Clermont-Ferrand (FR)

(72) Inventors: Mathieu Grandemange, Clermont-Ferrand (FR); Estelle Perrier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 400 days.

(21) Appl. No.: 16/480,612

(22) PCT Filed: Jan. 25, 2018

(86) PCT No.: PCT/FR2018/050171
§ 371 (c)(1),
(2) Date: Jul. 24, 2019

(87) PCT Pub. No.: WO2018/138440
PCT Pub. Date: Aug. 2, 2018

(65) Prior Publication Data
US 2019/0381835 A1  Dec. 19, 2019

(30) Foreign Application Priority Data

Jan. 27, 2017 (FR) ...................... 1750661

(51) Int. Cl.
*B60C 11/04* (2006.01)
*B60C 11/03* (2006.01)
*B60C 11/00* (2006.01)

(52) U.S. Cl.
CPC ........ *B60C 11/033* (2013.01); *B60C 11/0304* (2013.01); *B60C 2011/0025* (2013.01);
(Continued)

(58) Field of Classification Search
CPC ............... B60C 11/033; B60C 11/0304; B60C 2011/0025; B60C 2011/0033;
(Continued)

(56) References Cited

U.S. PATENT DOCUMENTS

2012/0180918 A1  7/2012  Sandstrom
2013/0299054 A1  11/2013  Kajimoto
(Continued)

FOREIGN PATENT DOCUMENTS

DE  39 01 624     8/1989
EP  0646480  *  4/1995  ............. B60C 11/04
(Continued)

*Primary Examiner* — Jeffrey M Wollschlager
*Assistant Examiner* — Shibin Liang
(74) *Attorney, Agent, or Firm* — Cozen O'Connor

(57) ABSTRACT

A tire, the speed rating of which is at least V, comprises a tread, having a volumetric void ratio at least equal to 2% and at most equal to 20%, having a central part Pc comprising at least one groove, and two lateral parts Pl each having a volumetric void ratio at most equal to 2%. The central part Pc of the tread has an axial width at most equal to one third of the axial width LBDR of the tread, and any portion of the central part Pc of the tread that is circumferentially delimited by two meridian planes separated by a circumferential distance dc equal to one tenth of the outer perimeter P of the tire comprises at least one and at most three grooves that open onto the meridian planes delimiting the portion in question.

13 Claims, 4 Drawing Sheets

(52) U.S. Cl.
CPC .............. *B60C 2011/0033* (2013.01); *B60C 2011/0346* (2013.01); *B60C 2011/0353* (2013.01); *B60C 2011/0355* (2013.01); *B60C 2011/0374* (2013.01); *B60C 2011/0383* (2013.01)

(58) Field of Classification Search
CPC ..... B60C 2011/0346; B60C 2011/0353; B60C 2011/0355; B60C 2011/0374; B60C 2011/0383; B60C 11/04
See application file for complete search history.

(56) References Cited

U.S. PATENT DOCUMENTS

2016/0193880 A1* 7/2016 Colombo ............ B60C 11/0304
152/209.9
2018/0163030 A1* 6/2018 Kamada ................ B60C 1/0016

FOREIGN PATENT DOCUMENTS

| EP | 2 292 451 | 3/2011 |
|----|-----------|---------|
| EP | 2 529 952 | 12/2012 |
| EP | 2 589 502 | 5/2013 |
| EP | 2 962 874 | 1/2016 |
| EP | 2 995 473 | 3/2016 |
| FR | 3 035 821 | 11/2016 |
| WO | WO 2013/021271 | 2/2013 |
| WO | WO 2014/193384 | 12/2014 |

* cited by examiner

TIRE WITH OPTIMISED TREAD

RELATED APPLICATIONS

This is a U.S. National Phase Application under 35 USC 371 of International Application PCT/FR2018/050171 filed on Jan. 25, 2018.

This application claims the priority of French application no. 1750661 filed Jan. 27, 2017, the entire content of which is hereby incorporated by reference.

FIELD OF THE INVENTION

The present invention relates to a passenger vehicle tire, the speed rating of which is at least V, that is to say a tire that is intended to be mounted on a vehicle, for example a competition vehicle, of which the maximum speed is at least equal to 240 km/h. The invention relates more particularly to the tread of such a tire. The expression "speed rating that is at least V" is understood to mean all tires of which the speed rating allows a maximum speed at least equal to 240 km/h.

BACKGROUND OF THE INVENTION

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. A circumferential plane is a plane perpendicular to the axis of rotation. The median circumferential plane, referred to as equator, is the plane perpendicular to the axis of rotation and passing through the middle of the tread.

In the following text, the expressions "radially on the inside of" and "radially on the outside of" mean "closer to the axis of rotation of the tire, in the radial direction, than" and "further away from the axis of rotation of the tire, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tire and an "axial distance" is a distance with respect to the equatorial plane of the tire. A "radial thickness" is measured in the radial direction and an "axial width" is measured in the axial direction.

A tire comprises a crown comprising a tread that is intended to come into contact with the ground via a tread surface, two beads that are intended to come into contact with a rim, and two sidewalls that connect the crown to the beads. Furthermore, a tire comprises a carcass reinforcement, comprising at least one carcass layer, radially on the inside of the crown and connecting the two beads.

The tread of a tire is delimited, in the radial direction, by two circumferential surfaces, the radially outermost of which is referred to as the tread surface and the radially innermost of which is referred to as the wear limit surface. In addition, the tread of a tire is delimited, in the axial direction, by two lateral surfaces. The tread is also made up of one or more rubber compounds, also referred to as rubbers. The expression "rubber compound" refers to a composition of rubber comprising at least an elastomer and a filler.

Passenger vehicles or competition vehicles of which the maximum speed is at least equal to 240 km/h can be used on racing circuits. In order to obtain maximum grip performance on dry ground, these vehicles are equipped with slick tires, i.e. ones without cuts in the tread. For use on wet roads, the tires are provided with cuts that open in particular onto the lateral surfaces of the tread in order to evacuate the water contained in the contact patch between the tire and the ground on which it runs.

A cut denotes either a well, or a groove, or a sipe, or a circumferential furrow, and forms a space opening onto the tread surface. A well has, on the tread, an opening surface inscribed in a circle of characteristic diameter W. A sipe or a groove has, on the tread surface, two characteristic main dimensions: a width W and a length Lo, such that the length Lo is at least equal to twice the width W. A sipe or a groove is therefore delimited by at least two main lateral faces that determine its length Lo and are connected by a bottom face, the two main lateral faces being at a non-zero distance from one another referred to as the width W of the sipe or of the groove. In the case of a groove of variable width, it is possible for a person skilled in the art to calculate a mean width of the groove.

In the context of competition, the grip performance on dry ground is fundamental. This objective is traditionally achieved by enlarging the ground contact surface area in order to maximize the contact forces between the tread and the ground on which it runs in the contact patch; this can be achieved by reducing the internal pressure of the tire, by optimizing the architecture of the tire, but it is impossible to reduce a volumetric void ratio which, by definition, is zero, that is to say in a tread without cuts.

Furthermore, when the governing body of the motor sport "formula 1" decided to limit the grip of tires, it obliged tire manufacturers to provide several circumferential furrows, in this case 4, distributed across the entire width of the tread of the tire in order to limit the amount of rubber in contact with the ground and thus the grip on dry ground.

However, there is an increasing need for grip that depends on the different racing regulations. These same rules limit the sizes of the tires. The solutions usually consist in varying the rubber compounds, or rubbers, of which the tread is made. However, the rubbers with the best grip often cause problems in terms of rate of wear since they are less stiff and wear away quickly.

In addition, in this specific context, the need for grip is greater at high speed, for braking at maximum speed on entering bends and not for stopping.

SUMMARY OF THE INVENTION

One object of the present invention is to increase the grip of a tire, the speed rating of which is at least V.

This and other objects are attained in accordance with one aspect of the invention directed to a tire that is intended to be mounted on a vehicle of which the maximum permissible speed is at least equal to 240 km/h, the axial width of which is at least equal to 200 mm, and having an outer perimeter P, comprising:

a tread, intended to come into contact with the ground via a tread surface, having an axial width LBDR and a volumetric void ratio at least equal to 2% and at most equal to 20%, the tread having a central part Pc, centred on an equatorial plane C and delimited by two circumferential planes (C1, C2), and two lateral parts PI positioned axially on either side of the central part Pc, each lateral part Pl having a volumetric void ratio at most equal to 2%, the central part Pc of the tread comprising at least one groove, forming a space opening onto the tread surface and being delimited by at least two main lateral faces connected by a bottom face, the at least one groove in the central part Pc of the tread having a mean width W at least equal to 6 mm and at most equal to 30 mm, preferably at most equal to 20 mm, and a depth H at least equal to 3 mm and at most equal to 6 mm, the central part Pc of the tread has an axial width at most equal to one third of the axial width LBDR of the tread, any portion of the central part Pc of the tread that is circumferentially delimited by two meridian planes separated by a circumferential distance dc equal to one tenth of the outer perimeter P of the tire comprises at least one and at most three grooves that open onto the meridian planes delimiting the portion in question.

The invention is based on the use of the aerodynamics of the tire. These aerodynamics only become influential for high-speed uses. It is for this reason that the invention relates to tires of which the speed rating is at least V or which are intended to be mounted on a vehicle of which the maximum speed is at least 240 km/h.

High-speed running of the tire causes raised pressure of the air outside the tire on entering the contact patch of the tire with respect to the running direction and negative pressure of this air on leaving the contact patch. The wider the tire, the greater this difference in pressure is. For a tire with a small width, this difference in pressure is not exploitable. Therefore, the invention relates to tires of which the axial width, measured between the axially outermost points of the tire, is at least equal to 200 mm.

By positioning a continuous groove in the tread between the start of the contact patch and the end, a flow of air is created which brings about a suction effect of the tire, which creates the equivalent of an aerodynamic load as would be made by a spoiler fitted on the vehicle. One of the advantages of this solution is that adding a spoiler increases the drag of the vehicle and thus the fuel consumption thereof, whereas the presence of a groove in the tread that allows the air to flow from the start to the end of the contact patch does not increase the drag of the vehicle.

The raised pressure and the negative pressure are at a maximum at the equatorial plane of the tire and decrease away from the latter, such that the groove(s) present in the tread should be advantageously positioned in the central part of the tread. This central part is centered on the equatorial plane of the tire and has an axial width equal to one third of the width of the tread (LBDR/3).

The groove(s) advantageously have a mean width at least equal to 6 mm in order to ensure that they do not close on passing through the contact patch. The mean width of the at least one groove is at most equal to 30 mm, preferably 20 mm, so as not to excessively reduce the area of the contact patch in order to ensure correct performance in terms of grip and behaviour at all speeds of the vehicle on which the tires are mounted. In addition, for this same objective, the volumetric void ratio of the tread should be at most equal to 20%, preferably at most equal to 12%.

If there are more than three grooves in the central part of the tread, the raised pressure and the negative pressure are reduced, as is the rate of flow in the grooves. As a consequence, the suction effect decreases and no longer compensates the loss of rubber in contact with the ground as a result of the presence of the grooves.

In order to realize the invention, the grooves should be disposed around the entire circumference of the tread of the tire, in the central part of the tread such that, regardless of the portion of the tread surface in contact with the ground, at least one groove and at most three grooves allow the air to flow from the start of the contact patch of the tire to the end of the contact patch. For this type of tire, in the high-speed phases in which the effect occurs, the contact patch represents at most one tenth of the circumference of the tire. In order to realize the invention, all that is thus necessary is to dispose the grooves such that any portion of the tread contained between two meridian planes, the circumferential distance (dc) of which is equal to one tenth of the outer perimeter of the tire, comprises at least one and at most three grooves that open onto the meridian planes delimiting the portion in question.

A groove is said to open onto a plane if the intersection between the plane and the groove is not zero. If the intersection between the groove and the two planes is not zero, the air can flow through the groove from one plane to the other. In addition, the circumferential distance between said meridian planes mentioned in the invention is such that it is at least equal to the circumferential length of the contact patch. Therefore, regardless of the circumferential position of the contact patch on the tire, there is a groove that allows air to flow between the raised pressure and the negative pressure on either side of the contact patch, making it possible, at high speed, to create the suction effect desired by the invention.

Given the grip performance intended for the tire, it is not advisable for the material that is in contact with the ground and thus forms at least a part of the tread not to have a high level of grip. The grip of a rubber material may in particular be characterized by the loss at 60° C., measured at 60° C. and 10 Hz. In a preferred solution, the tread comprises a rubber material, the loss factor of which, measured at 60° C. and 10 Hz, is at least equal to 25%, preferably at least equal to 35%.

The loss factor at 60° C., which is a loss of energy at 60° C. by rebound at a set energy level measured at the sixth impact and the value of which, expressed in %, is the difference between the energy supplied and the energy returned, divided by the energy supplied.

The tires in question are also designed to have high cornering stiffness and lateral stiffness in order to ensure a very good performance in terms of behaviour: the radial thickness of the tread is thus limited to 7 mm and, for an improved performance, limited to 5.5 mm. Since the invention requires the existence of a groove with a depth at least equal to 3 mm, the radial thickness of the tread is therefore at least equal to 3 mm. A preferred solution is for the tread to have a maximum radial thickness E at least equal to 3 mm and at most equal to 7 mm, preferably at most equal to 5.5 mm.

Given the distribution of raised pressures and negative pressures at the start and end of the contact patch with respect to the equatorial plane, a preferred solution is for the central part Pc, in which the grooves are disposed, to be centered on the equatorial plane and to have an axial width equal to one quarter of the tread width (LBDR/4), preferably to one fifth thereof (LBDR/5).

It is advantageous for the respective void ratios of the lateral parts Pl of the tread to be zero. This optimizes the contact patch of the tire and improves grip. The measurement of the volumetric void ratio does not take into account any devices for evaluating the wear limit of the tire on account of the wear in the tread, such as wear wells.

In the case of tires designed to be subject to high speeds, such as the tires according to the invention, it is common for the tires to have a predetermined direction of mounting on the vehicle. In this case, each tire has an outer axial edge and an inner axial edge. The inner axial edge is the edge intended to be mounted on the bodyshell side of the vehicle when the tire is mounted on the vehicle in said predetermined direction of mounting. In one advantageous solution, at least one groove of the tread has an inner main lateral face, axially closest to the inner axial edge, that forms a mean taper angle (AI) with a circumferential plane (XZ) that is at least equal to 10°, preferably at least equal to 30°. This solution makes it possible to defend against localized forms of wear of the tread at the lateral face of the at least one groove axially closest to the inner axial edge.

Although the outer lateral face of a groove, that is to say the one axially furthest away from the inner axial edge, referred to as the outer lateral face, is less sensitive to local wear, it may likewise be advantageous for said outer lateral face to form what is known as a taper angle with the radial axis. Given the asymmetries associated with the use of vehicles, one preferred solution is for the at least one groove in the tread to have an outer main lateral face, axially furthest away from the inner axial edge, that forms a mean taper angle (AE) with a circumferential plane (XZ) that is at least equal to the mean taper angle (AI) of the inner main lateral face.

The tires according to the invention can be used on closed circuits with the scope of motor racing competitions. In these competitions, the tires used can have grooves created by moulding, during the curing of the tire, or tires that may be cut by any mechanical cutting or machining method so as to have this type of groove. Cutting of the tire is in fact carried out in motorsports in order to adapt to the specific use conditions on the day of the competition.

In one advantageous solution, the central part Pc only contains substantially circumferential grooves around the entire circumference of the tread, in other words circumferential furrows. This solution is in fact the simplest embodiment of the invention. The invention also works with one, two or three substantially circumferential grooves. Advantageously, the central part Pc of the tread contains a single, substantially circumferential groove extending around the entire circumference of the tread.

It is advantageous for the axial positions of the lateral faces of the substantially circumferential groove to have variations (v) in the circumference at least equal to 1 mm with respect to their mean axial positions. These variations can thus create local narrowings in the groove by locally decreasing the section thereof in order to locally create a Venturi effect that will increase the rate of air flow and thus the association suction effect. These variations in axial position can also be coordinated between the two lateral faces of the grooves. This makes it possible to increase the shear stiffness of the tread around the grooves and thus to increase stiffness over the tire, this being an effect frequently desired in this type of tire.

It is thus particularly advantageous for the mean width W of the single, substantially circumferential groove to have variations (v) at least equal to 1 mm around the entire circumference of the tire.

It is advantageous for the wear limit of the tire as a result of wear to be indicated only with the aid of devices disposed in the tread away from the grooves in the central part Pc of the tread. Specifically, the presence of these devices, referred to as wear indicators, in the grooves can disrupt the flow and, depending on the disposition and geometry of said devices, reduce the effectiveness of the invention.

The vehicles on which the intended tires are mounted often do not have shielding around the mounted assemblies so as not to increase the weight of the vehicle. The term mounted assembly means, in technical language, a tire mounted on a rim.

These vehicles for which the acceleration performance of which is paramount are often likewise provided with aerodynamic spoilers in front of at least one of the mounted assemblies of the vehicle.

BRIEF DESCRIPTION OF THE DRAWINGS

The features and other advantages of the invention will be understood better with the aid of FIGS. 1 to 8, said figures not being drawn to scale but in a simplified manner so as to make it easier to understand the invention.

DETAILED DESCRIPTION OF THE DRAWINGS

Figure 1:
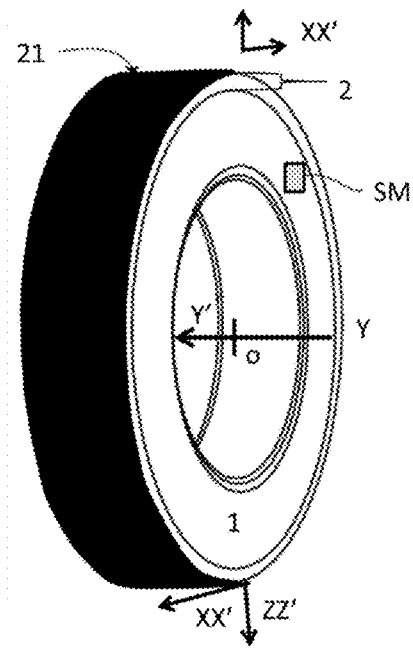
FIG. 1 is an overall view of the tire 1 according to an embodiment of the invention, in particular the tread 2 thereof and the tread surface 21 thereof. The tire in question is provided with a mounting direction SM indicated for example on the sidewall, but able to be indicated as desired by the manufacturers.

FIG. 1 shows a perspective view of a tire 1 having a tread 2 and a optionally a mounting direction SM recommended by the manufacturer. The tread has a tread surface 21. FIG. 1 also shows the frame of reference (O, X, Y, Z) used.

Figure 2:
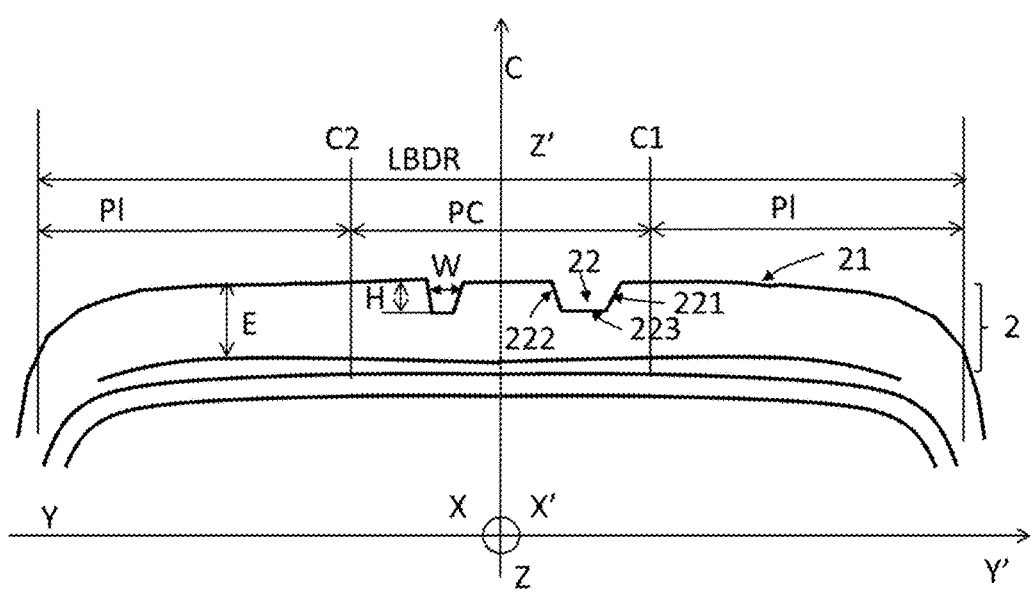
FIG. 2 shows a meridian section through the crown of a tire according to an embodiment of the invention and illustrates the central part Pc, the lateral parts Pl, the width LBDR of the tread, the grooves 22 and the two main lateral faces 221 and 222 thereof that are connected by a bottom face 223.

FIG. 2 schematically shows a meridian section, in a meridian plane YZ, through the crown of a tire according to the invention. It illustrates in particular the width LBDR and the thickness E of the tread 2, and also the central part Pc and lateral parts Pl thereof. Also shown are a groove 22 and the lateral faces 221 and 222 and the bottom face 223 thereof. The depth H of a groove 22 is the radial distance between the radially innermost point of the bottom surface 223 and the point of the tread 21 that is closest to said point. FIG. 2 also shows the mean width W of the groove 22.

Figure 3:
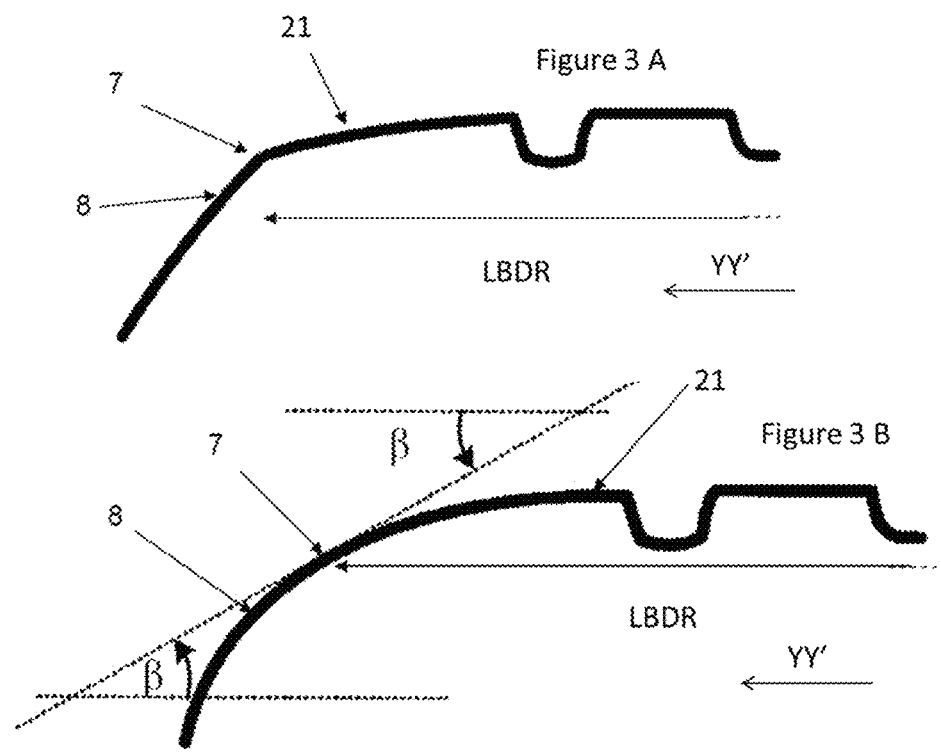
FIGS. 3A and 3B show two types of radially exterior meridian profile of the tread 2 of a passenger vehicle tire, for which the measurement of the width of the tread is specified.

In FIGS. 3A and 3B, the axial ends 7 of the tread, which make it possible to measure the tread width in this meridian plane, are determined in a meridian plane. In FIG. 3A, in which the tread surface 21 intersects the outer axial surface of the tire 8, the axial border 7 is determined trivially by a person skilled in the art. In FIG. 3B, in which the tread surface 21 is continuous with the outer axial surface of the tire 8, the tangent to the tread surface at any point on said tread surface in the region of transition towards the sidewall is plotted on a meridian section of the tire. The first axial border 7 passes through the point for which the angle β (beta) between said tangent and an axial direction YY' is equal to 30°. When, in a meridian plane, there are several points for which the angle β between said tangent and an axial direction YY' is equal to 30°, it is the radially outermost point that is taken into account. The same method is followed to determine the second axial end of the tread surface. The width of the tread, in the meridian plane, is the axial distance between the two points of the meridian plane of the two axial ends of the tread surface. The width of the tread of the tire is the maximum value of the widths of the tread over all the meridians.

Figure 4:
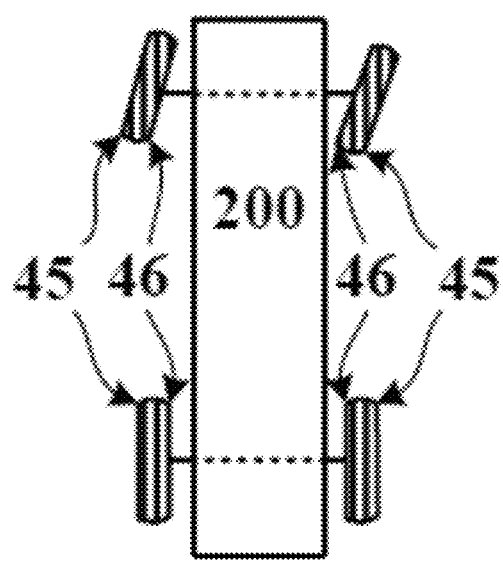
FIG. 4 defines the "inner axial edge" 46 and "outer axial edge" 45 of a tread.

FIG. 4 schematically shows tires mounted on mounting rims of wheels of a vehicle 200 and having a predetermined direction of mounting on the vehicle. Each tire has an outer axial edge 45 and an inner axial edge 46, the inner axial edge 46 being the edge mounted on the bodyshell side of the vehicle when the tire is mounted on the vehicle in said predetermined direction of mounting, the outer axial edge 45 being the opposite of that. In the document, the expression "outboard side of the vehicle" denotes the outer axial edge 45.

Figure 5:
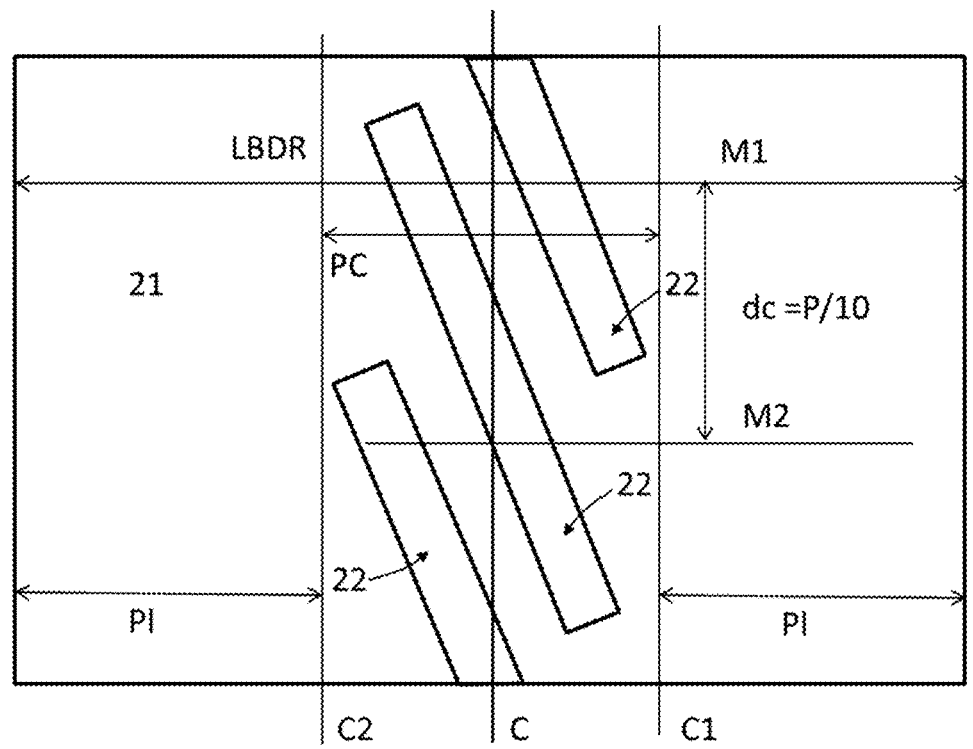
FIG. 5 illustrates a disposition of grooves 22 according to an embodiment of the invention.
Figure 6:
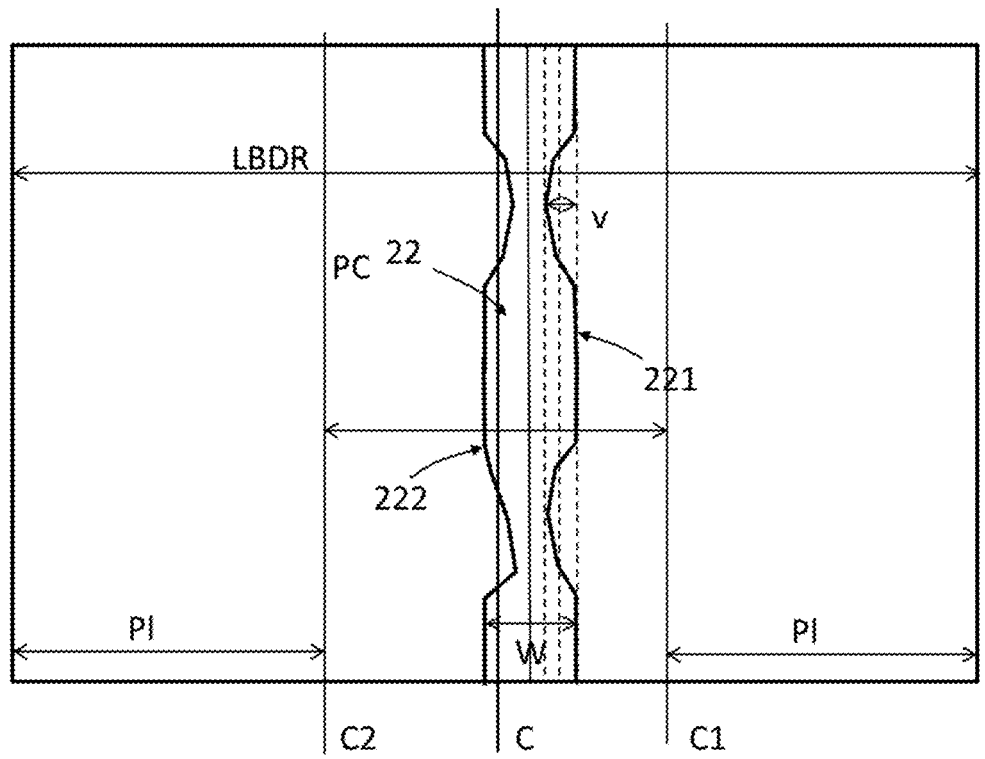
FIG. 6 illustrates a first embodiment of a tread according to an embodiment of the invention with a single circumferential groove 22, or circumferential furrow, the lateral faces 221 and 222 of which have variations in axial position (v) in the circumferential direction at least equal to 1 mm with respect to their mean axial position in order to create local Venturi effects.
Figure 7:
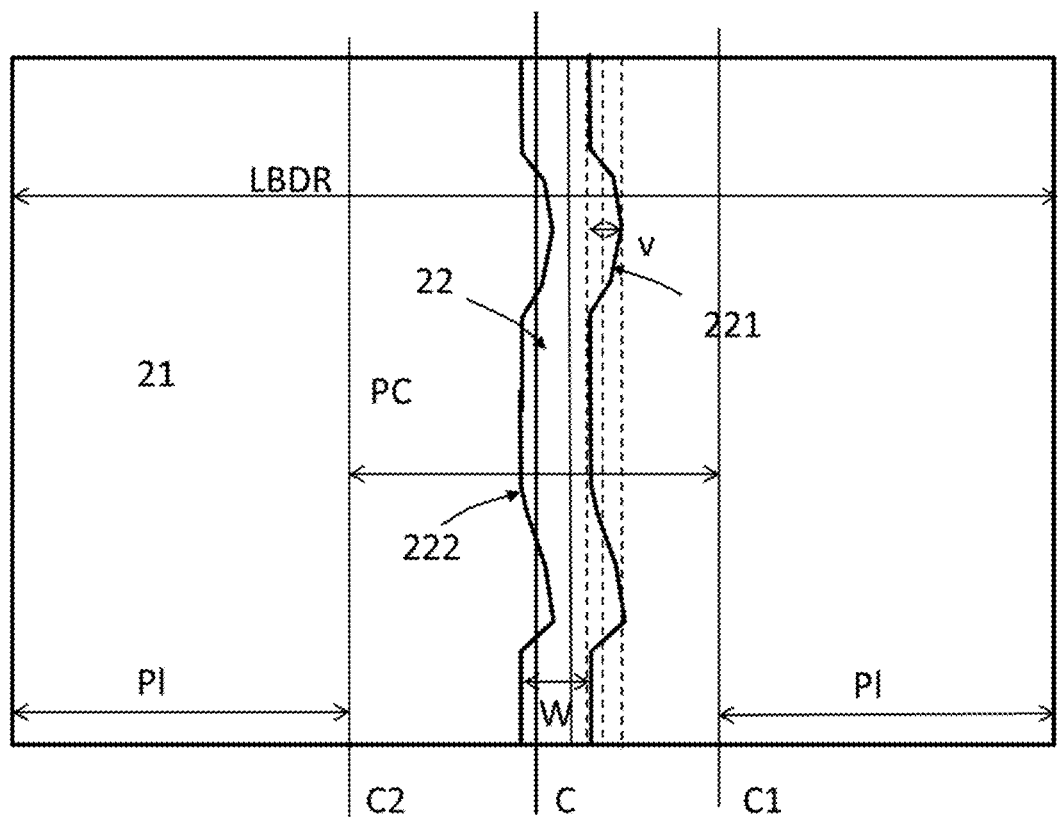
FIG. 7 illustrates a second embodiment of a tread according to an embodiment of the invention with a single circumferential groove 22, or circumferential furrow, the lateral faces 221 and 222 of which have variations in axial position (v) in the circumferential direction at least equal to 1 mm with respect to their mean axial position in order to stiffen the tire around the lateral faces of the groove.

FIGS. 5 to 7 show various embodiments of a tread according to the invention. FIG. 5 shows a tread, the central part Pc of which has several grooves 22 such that any portion of the central part Pc of the tread contained between two meridian planes (M1, M2), the circumferential distance dc of which is at most equal to one tenth of the outer perimeter of the tire P, comprises at least one and at most three grooves 22 that open onto the meridian planes (M1, M2) delimiting the portion in question, and are closed on the circumferential planes (C1, C2) delimiting the central part of the tread.

FIGS. 6 and 7 show two embodiments of a tread according to the invention with a single, substantially circumferential groove, or circumferential furrow, in the central part Pc. FIG. 6 presents variations (v) in the axial positions of the lateral faces 221 and 222 of the groove 22, creating variations in the width W of the groove that are likely to create Venturi effects in order to accentuate the suction effect of the invention, according to a first embodiment of the invention. This also increases the shear stiffness of the tread around the groove.

FIG. 7 presents variations (v) in the axial positions of the lateral faces 221 and 222 of the groove 22, without any variation in the width W of the groove, according to a second embodiment of the invention. This makes it possible to increase the shear stiffness of the tread around the groove without creating a Venturi effect, since the width W of the groove remains constant around the circumference. Stiffening the tread pattern in this way makes it possible to improve the performance in terms of behaviour and of wear of the tire.

Figure 8:
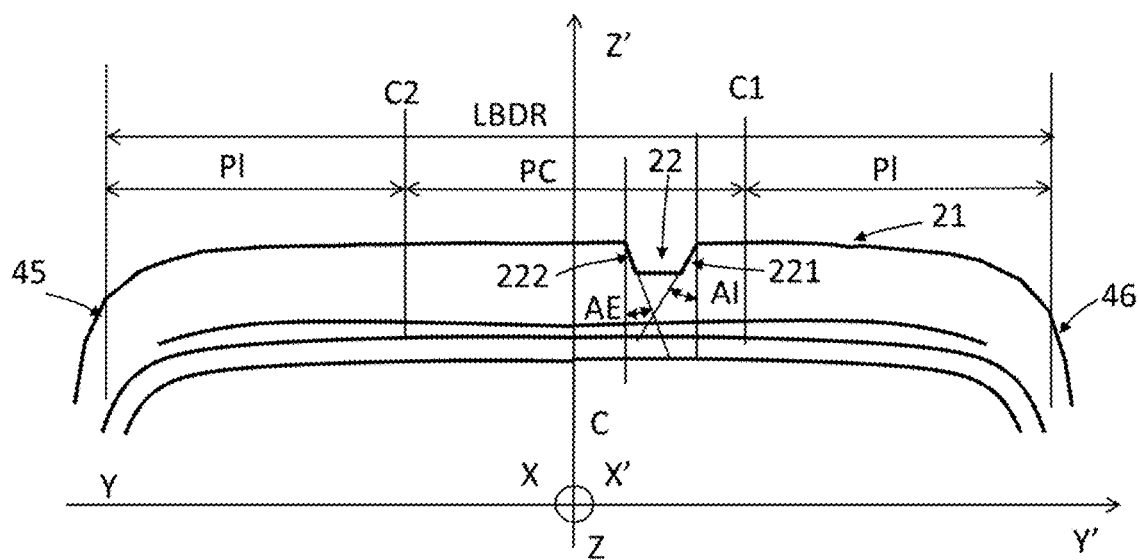
FIG. 8 illustrates the mean taper angle AI of the inner lateral face of a groove 22, axially closest to the inner axial edge 46 intended to be positioned on the inner side of the vehicle, and the mean taper angle AE of the outer lateral face of a groove 22, axially furthest away from the inner axial edge 46.

FIG. 8 shows, according to a third embodiment of the invention, the angles AI and AE, referred to as taper angles, of the inner lateral face 221 and of the outer lateral face 222, respectively, depending on their respective positions with respect to the inner axial edge 46 and outer axial edge 45 of the tire. The inner lateral face 221 is axially closer to the inner axial edge 46 of the tire. The taper angle of a lateral face of a groove is measured in the meridian plane between the radial axis and the tangent to the lateral face of the groove at the median radial coordinate point, between the tread surface and the radially innermost point of the bottom face of the groove in the meridian plane in question. The figure is in accordance with the invention; specifically, the taper angle AI of the inner lateral face 221 is at least equal to the taper angle AE of the outer lateral face 222. According to this embodiment of the invention, the taper angle AE is at most equal to the taper angle AI.

The inventors made calculations and carried out tests on the basis of the invention for a passenger vehicle tire of size 245/40 R18, inflated to a pressure of 1.7 bar in the cold state, with an axial width of 245 mm. They compared the tire A according to the prior art, with no grooves at all in its tread, with the tire B according to the invention, in the tread of which there are, in the central part Pc thereof, two circumferential grooves with a width of 10 mm and a depth of 4 mm, for a void ratio of 11%. The tread has a thickness of 5.7 mm. There are no other grooves or cuts in the lateral parts Pl of the tread, the void ratio of which is zero.

The tread comprises a rubber material, the loss factor of which, measured at 60° C. and 10 Hz, is equal to 54%. The taper angles of the lateral faces of the grooves are zero.

The grooves were obtained by cutting a control tire A.

The calculations showed a change in pressure in the contact patch that is able to be observed in a high-speed test. Positioning the grooves in the central part of the tread makes it possible, from the calculations, to double the pressure difference effect compared with positioning the grooves in the lateral parts.

The tires were tested during braking on one and the same motor racing vehicle. Said racing vehicle was tested with a set of tires A, referred to as the control set, and then with a set of tires B according to the invention. The result given is the average of three tests.

For braking at low speed of between 100 km/h and 5 km/h, the reduction in the contact area on account of the presence of the grooves is visible and the braking distance for the set of tires B according to the invention increases by more than 2.5% compared with the control set of tires A, this corresponding to a deterioration in the grip performance, but in a range of speeds that is of little interest on a motor racing circuit.

By contrast, in a braking test at a high speed of between 250 km/h and 150 km/h, the braking distance for the set of tires B according to the invention decreases by more than 0.8% compared with the control set of tires A, this corresponding to an improvement in the grip performance, in a range of speeds that is of interest on a motor racing circuit.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire, the speed rating of which is at least V, that is to say one that is adapted to be mounted on a vehicle of which the maximum permissible speed is at least equal to 240 km/h, the axial width of which is at least equal to 200 mm, and having an outer perimeter P, comprising:
   a tread, adapted to come into contact with the ground via a tread surface, having an axial width LBDR and a volumetric void ratio at least equal to 2% and at most equal to 20%;
   the tread having a central part Pc, centred on an equatorial plane C and delimited by two circumferential planes, and two lateral parts Pl positioned axially on either side of the central part Pc, each lateral part Pl being devoid of cuts and having a volumetric void ratio equal to 0%;
   the central part Pc of the tread comprising at least one groove, forming a space opening onto the tread surface and being delimited by at least two main lateral faces connected by a bottom face;
   the at least one groove in the central part Pc of the tread having a mean width W at least equal to 6 mm and at most equal to 30 mm, and a depth H at least equal to 3 mm and at most equal to 6 mm,
   wherein the central part Pc of the tread has an axial width at most equal to one third of the axial width LBDR of the tread, and wherein any portion of the central part Pc of the tread that is circumferentially delimited by two meridian planes separated by a circumferential distance dc equal to one tenth of the outer perimeter P of the tire comprises at least one and at most three grooves that open onto the meridian planes delimiting said portion.

2. The tire according to claim 1, wherein the tread comprises a rubber material, a loss factor P60 of which, measured at 60° C. and 10 Hz, is at least equal to 25%.

3. The tire according to claim 1, wherein the tread comprises a rubber material, a loss factor P60 of which, measured at 60° C. and 10 Hz, is at least equal to 35%.

4. The tire according to claim 1, wherein the tread has a maximum radial thickness E in a range of 3 mm to 7 mm.

5. The tire according to claim 4, wherein the tread has the maximum radial thickness E equal to 5.5 mm.

6. The tire according to claim 1, wherein the central part Pc of the tread has an axial width equal to one quarter of the axial width LBDR of the tread.

7. The tire according to claim 1, comprising the tread having two axial edges, one of which, positioned on the inner side of the vehicle, is referred to as the inner axial edge, wherein at least one groove in the tread has an inner main lateral face, axially closest to the inner axial edge, that forms a mean taper angle with a circumferential plane that is at least equal to 10°.

8. The tire according to claim 7, wherein the mean taper angle of the inner main lateral face is at least equal to 30°.

9. The tire according to claim 7, wherein the at least one groove in the tread has an outer main lateral face, axially furthest away from the inner axial edge, that forms a mean taper angle with a circumferential plane that is at most equal to the mean taper angle of the inner main lateral face.

10. The tire according to claim 1, wherein at least one groove in the central part Pc of the tread is obtained by moulding.

11. The tire according to claim 1, wherein at least one groove in the central part Pc of the tread is obtained by a mechanical cutting or machining operation.

12. The tire according to claim 1, wherein the central part Pc of the tread contains a single, substantially circumferential groove extending around the entire circumference of the tread.

13. The tire according to claim 12, wherein the mean width W of the single, substantially circumferential groove has variations (v) at least equal to 1 mm around the entire circumference of the tire.

* * * * *